United States Patent [19]
Subler

[11] 3,757,180
[45] Sept. 4, 1973

[54] SPEED CONTROLLER FOR AN ELECTRIC VEHICLE

[75] Inventor: Bruce M. Subler, North Star, Ohio

[73] Assignee: Crown Controls Corporation, New Bremen, Ohio

[22] Filed: July 31, 1972

[21] Appl. No.: 276,418

[52] U.S. Cl............. 318/139, 180/65 R, 318/341, 318/345, 318/349, 318/515
[51] Int. Cl. .......................................... H02p 7/14
[58] Field of Search.................... 318/17, 139, 341, 318/345, 349, 514, 515; 180/65 R

[56] References Cited
UNITED STATES PATENTS

| 3,517,290 | 6/1970 | Gunsser | 318/139 UX |
| 3,182,742 | 5/1965 | Dow | 318/139 X |
| 2,786,173 | 3/1957 | Martin et al. | 318/349 X |
| 3,416,059 | 10/1968 | Lagier | 318/514 X |

Primary Examiner—J. D. Miller
Assistant Examiner—H. Huberfeld
Attorney—Lawrence B. Biebel et al.

[57] ABSTRACT

An electrically powered vehicle is controlled by an operator walking therewith or riding thereon. A speed control switch is operable only when the operator rides the vehicle, and increases the maximum attainable speed thereof while having substantially no affect on slow speed operation.

6 Claims, 4 Drawing Figures

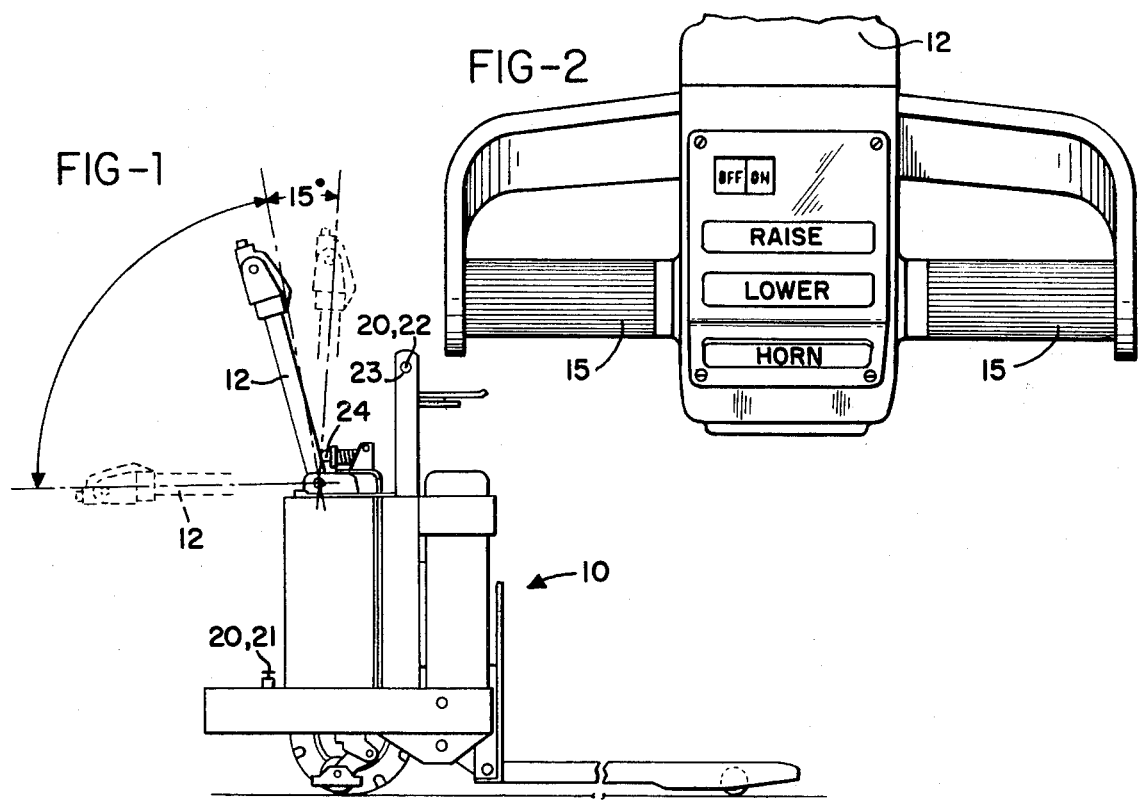
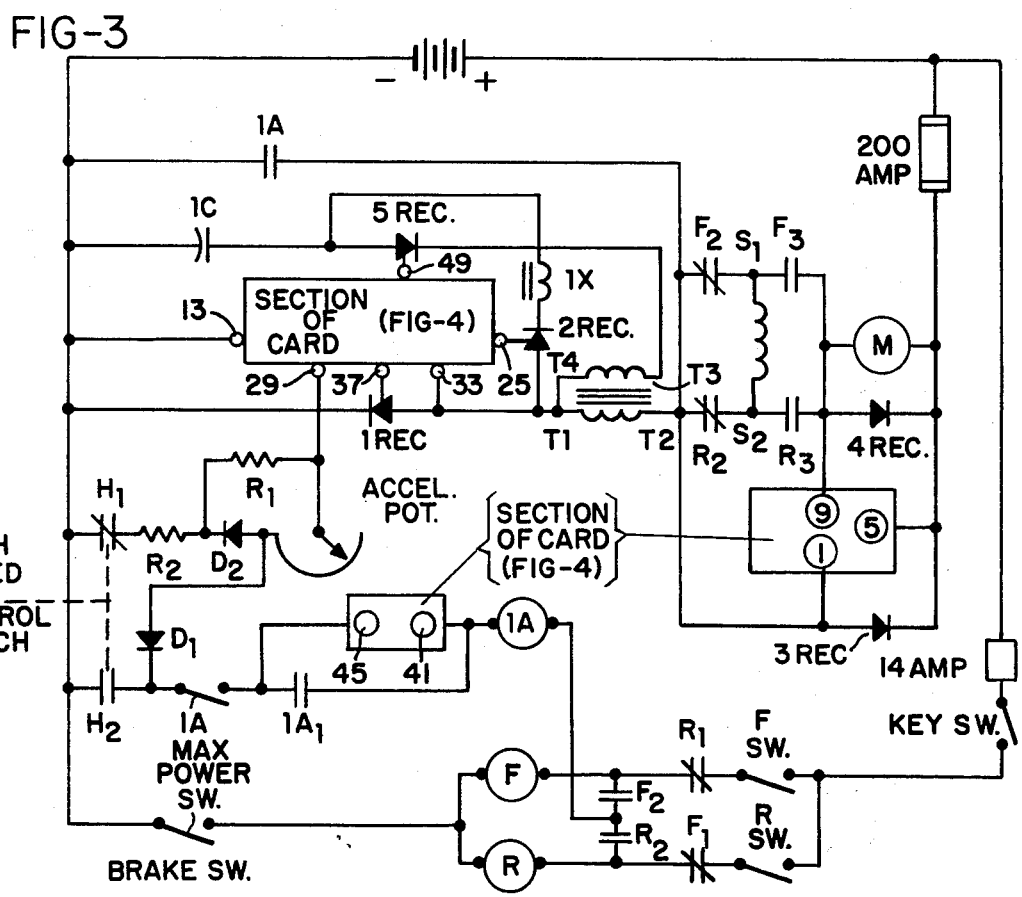

SPEED CONTROLLER FOR AN ELECTRIC VEHICLE

BACKGROUND OF THE INVENTION

This invention is related to speed controls for eletric vehicles, and more particularly to a speed range control which limits the top speed of a vehicle unless the operator is riding thereon.

The prior art abounds with self-propelled industrial vehicles where an operator may walk with or ride upon the vehicle while guiding and controlling its speed and braking. Such vehicles include self-propelled industrial trucks, powered trucks, lift trucks, and so on. Speed and steering for such vehicles are usually by means of switches and a control grip on the end of a steering tilter.

For safety reasons it has long been desirable to limit the maximum available speed of such a vehicle when the operator is not riding thereon but is controlling it instead from the outside.

SUMMARY OF THE INVENTION

It is therefore an object of this invention to provide a circuit which will enable the operator to have essentially identical initial starting speed when operating the vehicle as a rider, having the high speed switch depressed, or from a position wherein he is controlling the truck while walking beside it and the high speed switch is not activated due to the mode of operation; and to accomplish the above in an inexpensive, uncomplicated, durable, serviceable, reliable, and highly efficient manner for direct incorporation into such an electrically powered vehicle.

Briefly, a preferred embodiment of this invention includes an electrically driven self-propelled industrial vehicle, such a lift truck. A set of controls for controlling the motion of the vehicle is incorporated into the handle of a steering tiller located on the back thereof.

The steering tiller grip is rotatable and is part of the truck control system. Rotation in one direction causes the vehicle to move forwardly; rotation in the opposite direction moves the vehicle rearwardly. Increased rotation of the grip causes additional power to be supplied to the motor from an electronic control circuit, resulting in greater vehicle velocity.

The vehicle has a platform or operator station on the rear on which an operator may ride. The vehicle is also provided with a switch, such as a foot switch on the platform, a switch sensing the position of the steering tiller, a grip bar, etc., which enables the vehicle to operate at a faster speed. The switch is operable, however, only when the operator is riding the vehicle, and thus limits the speed of the vehicle when the operator is not riding thereon.

A by-pass circuit is provided around the electronic control circuit to apply maximum power to the motor for maximum speed. The maximum power by-pass circuit is activated by turning the control grip on the steering tiller to one extreme or the other, but cannot be activated unless the high-speed control switch is also actuated by the operator while riding on the vehicle.

The electronic control circuit includes a silicon controlled rectifier which controls the amount of power supplied to the motor. The rectifier, in turn, is controlled by an oscillator circuit, which itself is controlled by an accelerator potentiometer incorporated in the steering tiller. The potentiometer is operated by rotation of the control grip.

The accelerator potentiometer thus controls the speed of the vehicle by altering the resistance it presents to the oscillator. The less the potentiometer resistance, the greater the speed.

The high speed control circuit is a series-parallel resistance circuit around the accelerator potentiometer which limits the minimum resistance thereof when the high speed control switch is not actuated, thus limiting the maximum speed of the vehicle. Actuation of the high speed control switch leaves the maximum resistance (slow speed) of the accelerator potentiometer unchanged, but removes the series-parallel circuit to allow the minimum resistance of the potentiometer to be applied directly to the oscillator, for maximum speed.

The high speed control switch also includes a switch in series with the maximum power by-pass circuit to prevent activation of that circuit unless the high speed control switch is actuated.

BRIEF DESCRIPTION OF THE DRAWINGS

FIG. 1 is an illustration of an electric, self-propelled lift truck vehicle incorporating the speed controller of this invention;

FIG. 2 is an illustration of the control grip on the end of the steering tiller;

FIG. 3 is a schematic illustration of the motor control circuit of this invention.

DESCRIPTION OF THE PREFERRED EMBODIMENT

Figure 4:
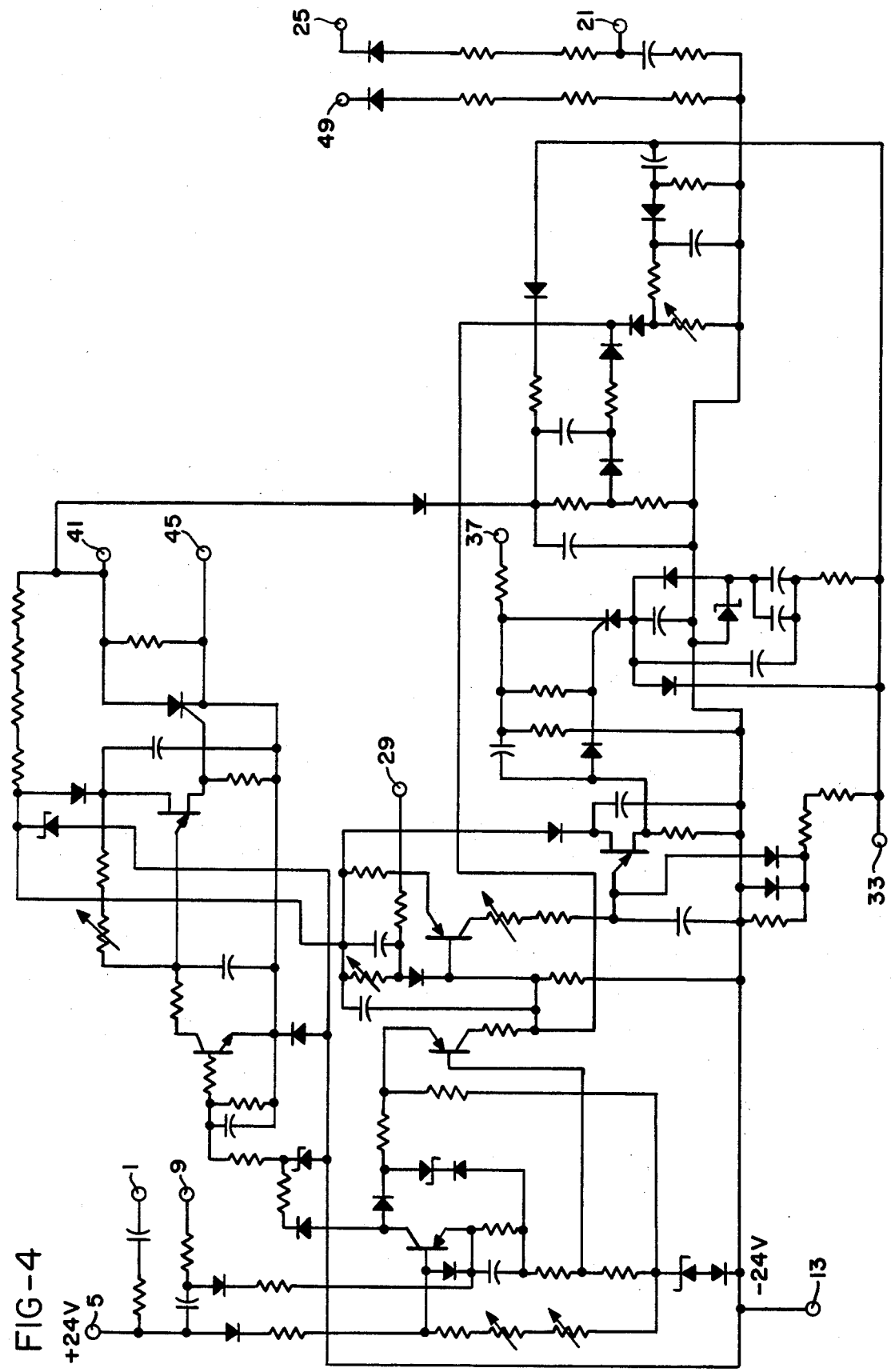
FIG. 4 is a schematic of the electronic circuit which controls the circuit of FIG. 3.

With reference to the drawings, and more particularly to FIG. 1, there is illustrated a vehicle 10, such as an industrial electric lift truck, incorporating the speed controller of this invention. The motion of the vehicle is regulated by a steering tiller 12 having a rotatable control grip 15 on the end thereof. Left or right movement of steering tiller 12 steers vehicle 10 to the left or right in known fashion. Similarly, rotation of control grip 15 in one direction applies forward motive power to the vehicle and reverse rotation of the control grip applies reverse power. The greater the rotation of the grip, the greater the power applied, allowing the steering tiller to control both the speed and the direction of the vehicle, as well as any other desired functions.

A high speed control switch 20 is provided on the vehicle to enable the operator to operate the vehicle at a higher speed when he is riding thereon. High speed control switch 20 may be, for example, a platform switch 21, operable by the operator's foot when riding on the vehicle. Alternatively, high speed control switch 20 may be a grip bar switch 22, operated when the operator grasps grip bar 23 as he rides on the vehicle. Switch 20 may also be a steering tiller sensing switch 24, which detects when tiller 12 is elevated above a certain point, such as 15° from the vertical. Any other arrangement for switch 20 may be employed, of course, to make it operable only when the operator is actually riding on the vehicle.

With reference to FIG. 3, there is illustrated the control circuit for controlling the drive motor of vehicle 10, and FIG. 4 is a schematic for the electronic circuit card which controls the circuit of FIG. 3. The FIG. 4 circuit card is a commercially available control for DC motor system such as those used in industrial fork lift trucks. Typical such control cards are available as purchased items from the General Electric Company.

When rotatable control grip 15 is rotated to one extreme or the other, the 1A maximum power by-pass switch (FIG. 3) is engaged, which enables full power to be applied directly to the motor of the vehicle for maximum speed thereof. The maximum power by-pass switch, however, is wired in series with contacts H2 of high speed control switch 20, so that maximum power cannot be applied to the vehicle unless the operator is riding thereon.

When less than maximum power is being applied to the motor, the amount of power received by the motor is regulated by a silicon controlled rectifier (SCR), referred to as 1 REC. 1 REC is controlled by an oscillator circuit which is incorporated on the circuit card of FIG. 4. The oscillator on the circuit card is controlled, in turn, by an adjustable accelerator potentiometer.

With reference to FIG. 3, the control circuit is energized by closing the key switch and depressing the brake pedal (not shown), closing the brake switch. When the rotatable control grip is rotated either forward or reverse, current will flow from battery positive through the 14 amp fuse, the key switch, the F or R switch and contactor coil, and the brake switch to battery negative. When the F or R contactors are energized, power is applied to the drive motor circuit. Power is also applied to the oscillator.

The oscillator output is fed from terminal 37 to the gate lead of 1 REC, the main SCR. This signal on the gate lead will switch 1 REC to the conducting state. When 1 REC is conducting, current will flow from battery positive through the 200 amp fuse, the drive motor, the transformer terminals T2-T1, 1 REC, and back to battery negative. The initial rising DC current through T2-T1 induces a voltage from T4 to T3, driving T3 below battery negative. This causes current to flow from terminal 49 of the card to the gate of 5REC which turns 5 REC on. Current then flows from transformer secondary T4 through 1 REC, 1 C, 5 REC, and back to T3, charging 1 C negative until the transformer saturates, reducing this current flow to zero, and turning off 5REC. The voltage at T3 then changes from negative to positive, causing current to flow from terminal 25 of the card to the gate of 2 REC, turning 2 REC on. With 2 REC conducting, capacitor 1 C discharges around the circuit composed of 1 C, 1 REC, 2 REC, and 1 X. This discharge current opposes battery current through 1 REC so that the resultant current is zero. With reverse voltage across 1 REC (the main SCR), 1 REC is turned off.

This explains one complete cycle or pulse of operation.

During the "off" time, the energy stored in the motor field, by virtue of its inductance, will cause current to circulate from the field through 3 REC and back into the motor. This is called "fly-back current" and actually causes current to flow through the motor when there is no battery drain. This allows the average motor current to be greater than the average battery current, which results in power savings and a longer battery life.

As indicated, the time for the next cycle to start is determined by the time the oscillator section of the card takes to oscillate. With level operation, the SCR circuit is capable of delivering up to approximately 90 percent of full speed. When full speed is desired, the rotatable control grip is rotated for maximum speed, as indicated earlier, and closes the 1A maximum power by-pass switch in the end of steering tiller 12. This enables the 1A relay to be closed, which then applies full battery potential to the drive motor by by-passing the SCR control.

The portion of the circuit represented by 4 REC and by card terminals 1, 5, and 9 is a plugging circuit to eliminate severe reversal of the truck, and help protect the operator and the load as well. If the twist grip is rotated suddenly from forward to reverse or vice-versa, the motor field is reversed. During the 1 REC off time, the motor armature, driven by the inertia of the truck, acts as a generator. This generated current passes through 4 REC. A signal taken from 4 REC, when plugging current is present, is fed into the card, retarding the pulse frequency and providing a soft direction reversal stopping action.

A time delay safety control circuit on the card between terminals 45 and 41 cooperates with terminals 1A1 on relay 1A to prevent the maximum power bypass circuit from being engaged until the vehicle has had a chance to accelerate, and thus to prevent the vehicle from being started in a bypass condition. This protection is accomplished by incorporating normally open contacts 1A1 in series with the power line to relay 1A. As a result, relay 1A cannot close until contacts 1A1 are by-passed by means of terminals 45 and 41. The safety control circuit provides this by-pass, and is thus able to prevent premature engaging of relay 1A.

Terminal 29 is the control connection on the circuit card for controlling the rate of the oscillator. The amount of resistance between terminal 29 and the negative side of the battery controls the oscillator frequency. The greater the resistance, the slower the rate of oscillation, and the slower the firing of 1 REC; the lower the resistance, the faster the rate of oscillation. A decrease in the resistance will thus result in more frequent firing of 1 REC and greater power reaching the vehicle motor, and vice versa.

The resistance between terminal 29 and the negative side of the battery is controlled by the accelerator potentiometer on the rotatable control grip 15. In order to provide for slow speed operation when the operator is walking beside the vehicle, but to allow higher speed operation when he is riding thereon, the resistance between terminal 29 and the negative side of the battery is also affected by a series-parallel resistance circuit which incorporates the accelerator potentiometer. The series-parallel resistance circuit may be selectively engaged or disengaged by the high speed control switch.

The series-parallel resistance circuit is necessary since simply by-passing a portion of the accelerator potentiometer resistance, when going into the high speed mode, would result in an abrupt decrease of the control circuit resistance. This would in turn cause an abrupt increase in the rate of movement of the vehicle. While this might not be significant were the vehicle already rapidly moving, it could be quite dangerous where the vehicle was being maneuvered slowly.

The high speed control circuit obviates this problem. In the slow speed (not actuated) mode, normally closed contacts H1 on the high speed control switch are connected from the negative side of the battery to resistor R2. Resistor R2 is in turn connected both to diode D2 and resistor R1, parallel to the accelerator potentiometer. The accelerator potentiometer and R1 are in turn connected to terminal 29 of the card. Current thus flows from terminal 29 through the accelerator potentiometer and diode D2 in parallel with resistor R1, and then through resistor R2 to battery negative.

When the high speed control switch is actuated, normally closed contacts H1 are opened and normally open contacts H2 are closed. The current then flows from terminal 29 directly through the accelerator potentiometer and through diode D1 to battery negative. High speed control switch terminals H2 also complete the circuit for relay 1A, allowing the maximum power by-pass to be engaged when the high speed control switch is actuated.

As an illustration, if the resistance of the accelerator potentiometer is 5K ohms, the resistance of R1 5K ohms, and the resistance of R2 2.5K ohms, then the maximum resistance between terminal 29 and the negative side of the battery will be 5K ohms, controlling the low speed of the vehicle, regardless of whether or not the high speed control switch is actuated. On the other hand, when the high speed control switch is not actuated, the minimum resistance will be 2.5K ohms, allowing only a moderately fast upper speed, whereas when the high speed control switch is actuated, the minimum resistance will be zero. Thus the low speed ranges and control of the vehicle are substantially unaltered by the high speed control switch, while the maximum speed of the vehicle is substantially increasable thereby. With these circuits it is therefore possible to engage the high speed control switch when the vehicle is being carefully manuevered at a creep or very low speed, without causing the vehicle to speed up.

While the method and form of apparatus herein described constitue a preferred embodiment of the invention, it is to be understood that the invention is not limited to this precise method and form of apparatus, and that changes may be made therein without departing from the scope of the invention which is defined in the appended claims.

What is claimed is:

1. In a control for an electric powered vehicle having a drive motor, a speed controller connecting a power source to the motor and arranged to adjust the motor speed, the controller including a solid state device operative to vary the quantity of power supplied to the motor, and an adjustable potentiometer controlling the solid state device, the improvement comprising:
   a. a series-parallel resistance circuit connected to the potentiometer to form in combination, a high and low speed control circuit, and
   b. a high and low speed control switch connected to said control circuit and operative to change one of the minimum and the maximum resistance ranges of said control circuit while leaving the other range substantially unchanged to permit said potentiometer to control said solid state device for faster operation of said motor in response to the changed resistance range of said control circuit, while leaving the low speed control range of said control circuit substantially unchanged.

2. The control of claim 1 further comprising:
   a. a maximum power by-pass circuit, operable when said high and low speed switch is actuated, to by-pass said solid state device and to apply full power to said motor, and
   b. a maximum power control switch to control said by-pass circuit.

3. The control of claim 2 wherein said high and low speed switch is operable by an operator only when riding upon the vehicle, to limit the maximum speed of the vehicle and to prevent said maximum power circuit from applying full power to said motor when the operator is not riding upon the vehicle.

4. The control of claim 1 wherein said control switch is operable by an operator only when riding upon the vehicle, to limit the maximum speed of the vehicle when the operator is not riding thereon.

5. The control of claim 4 wherein said high and low speed control circuit includes:
   a. a substantially fixed first resistance in parallel with the potentiometer,
   b. a substantially fixed second resistance in series with said parallel first resistance and potentiometer, and
   c. means responsive to said control switch to remove said first and second resistances from operative relation with the potentiometer.

6. In a control for an electric powered vehicle having a drive motor, a speed controller connecting a power source to the motor and arranged to adjust the motor speed, the controller including a solid state device operative to vary the quantity of power supplied to the motor, and an adjustable potentiometer controlling the solid state device, the improvement comprising:
   a. a series-parallel resistance circuit connected to the potentiometer to form in combination, a high and low speed control circuit,
   b. a substantially fixed first resistance in said series-parallel resistance circuit, said fixed first resistance being in parallel with the potentiometer,
   c. a substantially fixed second resistance in said series-parallel resistance circuit, said fixed second resistance being in series with said parallel first resistance and potentiometer,
   d. means to remove said first and second resistances from operative relation with the potentiometer,
   e. a high and low speed control switch operable by an operator only when riding upon the vehicle, said high and low speed control switch being connected to said control circuit and said removing means to change the minimum resistance range of said control circuit while leaving the maximum range substantially unchanged, to permit said potentiometer to control said solid state device for faster operation of said motor in response to the changed resistance range of said control circuit, while leaving the low speed control range of said control circuit substantially unchanged, and to limit the maximum speed of the vehicle when the operator is not riding thereon,
   f. a maximum power by-pass circuit to by-pass said solid state device and to apply full power to said motor, said by-pass circuit being operable only when said high and low speed switch is actuated, to prevent said maximum power circuit from applying full power to said motor when the operator is not riding upon the vehicle, and
   g. a maximum power control switch to control said by-pass circuit.

* * * * *